United States Patent
Hildebrandt et al.

(10) Patent No.: US 6,926,252 B2
(45) Date of Patent: Aug. 9, 2005

(54) DRIVE DEVICE

(75) Inventors: Joerg Hildebrandt, Maintal (DE); Stefan Koehler, Frankfurt (DE)

(73) Assignee: Siemens Aktiengesellschaft, Munich ( * ) Notice: Subject to any disclaimer, the term of this patent is extended or adjusted under 35 U.S.C. 154(b) by 14 days.

(21) Appl. No.: 10/740,790

(22) Filed: Dec. 22, 2003

(65) Prior Publication Data

US 2004/0149261 A1 Aug. 5, 2004

Related U.S. Application Data

(63) Continuation of application No. PCT/DE02/02607, filed on Jul. 17, 2002.

(30) Foreign Application Priority Data

Jul. 30, 2001 (DE) .......................... 101 37 026

(51) Int. Cl.$^7$ ................................ F02D 11/10
(52) U.S. Cl. .................. 251/305; 123/396; 123/399
(58) Field of Search .................. 251/305; 123/396, 123/399

(56) References Cited

U.S. PATENT DOCUMENTS

| | | | |
|---|---|---|---|
| 6,189,507 B1 | 2/2001 | Tsuchiya et al. | |
| 6,200,221 B1 | 3/2001 | Maejima et al. | |
| 6,267,352 B1 * | 7/2001 | Semeyn et al. | 251/129.12 |
| 6,488,010 B2 * | 12/2002 | Saito et al. | 123/399 |
| 6,502,542 B1 * | 1/2003 | Stuart | 123/337 |
| 6,513,491 B1 * | 2/2003 | Harvey | 123/361 |
| 6,575,427 B1 * | 6/2003 | Rauch et al. | 251/69 |
| 6,666,423 B1 * | 12/2003 | Nemoto | 248/421 |
| 6,672,564 B2 * | 1/2004 | Johann et al. | 251/286 |
| 6,691,678 B1 * | 2/2004 | Hashimoto et al. | 123/399 |
| 6,776,137 B2 * | 8/2004 | Kawai et al. | 123/399 |

FOREIGN PATENT DOCUMENTS

| | | | |
|---|---|---|---|
| DE | 820659 | 11/1951 | |
| DE | 4444534 A1 | 6/1996 | |
| DE | 19736521 A1 | 2/1999 | |
| DE | 19842195 A1 | 3/2000 | |
| EP | 0272352 A2 | 6/1988 | |
| EP | 0548945 A2 | 6/1993 | |
| JP | 05065949 A | 3/1993 | |
| JP | 09329211 A | 12/1997 | |
| JP | 1134095 | 12/1999 | |
| WO | WO 03/016696 * | 2/2003 | ........... F02D/11/10 |

OTHER PUBLICATIONS

XP-002222544; Matshushita Denki Sangyo K.K.; JP.
English translation of Patent Documentation DE 820 659; Sep. 27, 1951; Telefonbau und Normalzeit GmbH; D–Frankfurt.
Derwent–Abstract DE 19736521A1; Feb. 25, 1999; Mannesmann VDO AG, D–60388 Frankfurt.
Derwent–Abstract DE 4444534A1; Jun. 20, 1996; Pierburg GmbH; D–41460 Neuss.
Derwent–Abstract DE 19842195A103/16/2000; Deutsche Thomson–Brandt GmbH; D–78048 Villingen–Schwenn.

* cited by examiner

Primary Examiner—J. Casimer Jacyna
(74) Attorney, Agent, or Firm—Jacob Eisenberg; Siemens AG

(57) ABSTRACT

A drive device enabling a movable element to be driven by an actuator via a gear system comprising a motor pinion gear, an intermediate gear and a partial toothed gear. An aim of the invention is to create a particularly compact device which can capture the kinetic energy of the actuator in a particularly reliable manner. The intermediate gear comprises a pinion and a toothed gear. The pinion and toothed gear are connected via a ratchet in such a way that the opinion which is rotationally fixed to the ratchet can be rotated counter to the toothed wheel in a manner similar to that of a locking ratchet wheel.

5 Claims, 5 Drawing Sheets

DRIVE DEVICE

CROSS REFERENCE TO RELATED APPLICATIONS

The present application is a continuation of international application PCT/DE02/02607, filed 17 Jul., 2002, which designated the United States, and claims priority to German priority document 10137026.1, filed 30 Jul., 2001, the both of which are herein incorporated by reference.

BACKGROUND OF THE INVENTION

The invention relates to a drive device, in which a movable element can be driven by an actuator via a gear unit and in which the gear unit comprises a motor pinion, an intermediate wheel and a toothed ring, and the intermediate wheel comprises a pinion and a gearwheel, the pinion and the gearwheel being connected via a ratchet in such a way that the pinion connected fixedly in terms of rotation to the ratchet can be rotated in relation to the gearwheel in the manner of a locking pawl.

To control the quantity of fresh gas of a motor vehicle, throttle valve assemblies are usually used. Throttle valve assemblies comprise a housing with a throttle orifice and a throttle member arranged in the throttle orifice. The throttle member conventionally comprises a throttle valve which is arranged on a throttle valve shaft and which is arranged pivotably in the housing of the throttle valve assembly. The throttle valve assumes a defined position in the throttle orifice for the passage of a defined quantity of fresh gas. For this purpose, the throttle valve shaft can be activated mechanically or electromechanically.

In an electromechanical activation of the throttle valve shaft, the throttle valve assembly normally has a position detection means, via which the current position of the throttle valve shaft can be detected. Depending on the in each case current position of the throttle assembly, the current position being indicated by a signal, another signal is then generated either inside or outside the throttle valve assembly, by means of which the throttle valve shaft can be activated via the actuator arranged in the throttle valve assembly. In this case, depending on the position of the throttle valve shaft and consequently of the throttle valve, the throttle orifice is partially closed by the throttle valve, this corresponding to an open position of the throttle valve, or else is also closed completely by the throttle valve, this corresponding to a closing position of the throttle valve.

If the actuator adjusts the throttle valve position from open to closed, the actuator current is switched off only after the throttle valve shaft, together with the throttle valve arranged on it, assumes a position in which the throttle valve substantially closes the throttle orifice. However, after the actuator or its current has been switched off, it still rotates a little further on account of the kinetic energy of its rotor. Consequently, the actuator transmits kinetic energy to the gear unit. The gear unit should absorb the kinetic energy without being damaged. If, however, the throttle valve shaft is in a position which corresponds to the closed position of the throttle valve and the throttle valve bears mechanically, in the closing position, against a step in the throttle orifice, the gear unit, on account of the kinetic energy transmitted to it, will attempt to rotate the throttle valve beyond the step in the throttle orifice. Since the abutment is normally harder than the gearwheels of the gear unit, this often results in a fracture of individual gears of the gearwheels of the gear unit, without the throttle valve being pivoted by the throttle valve shaft. This foreseeable gear unit damage considerably shortens the useful life of gear units of this type, as a result of which their use, particularly in throttle valve assemblies, is uneconomical.

Such a drive device is known, for example, from EP 0 272 352 A2. Herein, the intermediate gearwheel has a ratchet. The gearwheel has a ring of detent pawls and the pinion has ratchet geometries prestressed in relation to the detent pawls. The pinion is manufactured in one piece with the ratchet geometries. The ratchet consequently prevents excess kinetic energy from being transmitted to the movable element. One disadvantage of the known drive device, however, is that the gear unit has a high weight. The high weight of the drive device decisively contributes, however, to the generation of the excess kinetic energy.

It is known from US 6,189,507 B1, in a drive device, to design the toothed ring as a part-toothed ring. This leads to a reduction in weight. This drive device has the disadvantage, however, that the remaining kinetic energy is transmitted directly to the movable element, thus resulting in a short useful life of the drive device.

SUMMARY OF THE INVENTION

The present invention is directed to a drive device of the abovementioned type wherein the gear unit has a particularly low weight and wherein the device may be manufactured in a particularly simple way.

These and other objects are achieved, according to the invention, by designing the toothed ring as a part-toothed ring, and in that the gearwheel and the pinion are manufactured from plastic and the ratchet from metal, the ratchet being snapped onto the pinion.

As a result of this configuration, the weight of the gear unit is reduced by the toothed ring being designed as a part-toothed ring. Furthermore, the gearwheel and the pinion are manufactured from plastic instead of metal, thus resulting in a further reduction in the weight. The ratchet itself may be manufactured as a thin and stable sheet-metal part and, for assembly, can simply be snapped onto the pinion.

Advantageously, the movable element is a throttle valve shaft which is arranged in a throttle valve assembly and on which a throttle valve is arranged pivotably. Throttle valve assemblies with a drive device of this type have a particularly low space requirement and can therefore be used in a particularly versatile way.

The advantages achieved by means of the invention are, in particular, that, on the one hand, the drive device has a particularly low space requirement, and that kinetic energy of the actuator can be absorbed reliably with a gear unit of the drive device even when the throttle valve shaft is secured in a fixed position via the throttle valve bearing against an abutment in the throttle orifice.

BRIEF DESCRIPTION OF THE SEVERAL VIEWS OF THE DRAWINGS

The present invention is set out with respect to the drawings which depict the following.

DETAILED DESCRIPTION OF THE INVENTION

Parts corresponding to one another are given the same reference symbols in all the figures.

Figure 1:
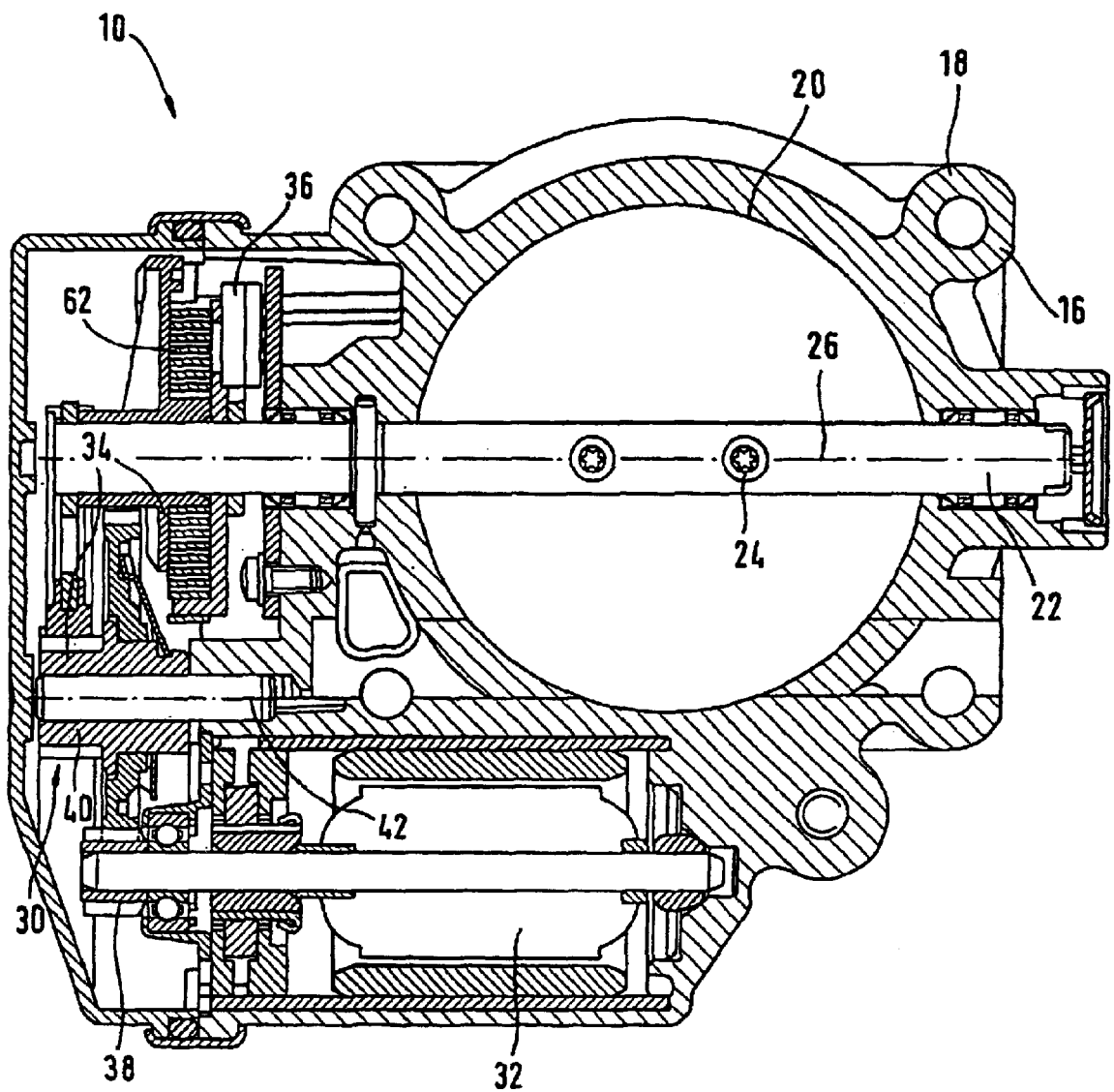
FIG. 1 depicts a cross section through a throttle valve assembly with a drive device for pivoting a throttle valve arranged on a throttle valve shaft.

The throttle valve assembly 10 according to FIG. 1 serves for supplying an air or a fuel/air mixture to a consumer, not illustrated, for example an injection device of a motor vehicle, likewise not illustrated, the fresh gas quantity to be supplied to the consumer being capable of being controlled by means of the throttle valve assembly 10. For this purpose, the throttle valve assembly 10 has a housing 16 which is manufactured predominantly from metal 18, in particular aluminum, and has been produced by the injection molding method. Alternatively, however, the housing 16 may also be manufactured completely from plastic. The housing 16 has a throttle orifice 20 via which air or a fuel/air mixture can be supplied to the consumer.

To set the volume of fresh gas to be supplied, a throttle valve 23 is arranged on a throttle valve shaft 22. The throttle valve 23 cannot be seen on account of the sectional illustration in FIG. 2. However, the fastening points 24, at which the throttle valve 23 is fastened on the throttle valve shaft 22, can be seen. A rotation of the throttle valve shaft 22 about its axis of rotation 26 gives rise at the same time to the pivoting of the throttle valve 23 arranged on the throttle valve shaft 22, with the result that the active cross section of the throttle orifice 20 is. increased or reduced. By means of an increase or reduction in the active cross section of the throttle orifice 20 by means of the throttle valve 23, a regulation of the throughput of the air or fuel/air mixture through the throttle orifice 20 of the throttle valve assembly 10 takes place.

The throttle valve shaft 22 may be connected to a pulley, not illustrated, which, in turn is connected via a Bowden cable to a setting device for a power requirement. The setting device may in this case be designed as the accelerator pedal of a motor vehicle, so that, by this setting device being actuated by the driver of the motor vehicle, the throttle valve 23 can be brought from a position of minimum opening, in particular a closed position, into a position of maximum opening, in particular an open position, in order to control the power output of the vehicle.

In contrast, the throttle valve shaft 22 may either be set by an actuator over a part or total range of adjustment via the accelerator pedal. In so called E-gas or Drive-by-wire systems, the mechanical power control, for example the depression of an accelerator pedal, is converted into an electrical signal. This signal is supplied, in turn, to a control unit which generates an activation signal for the actuator. In these systems, there is no mechanical coupling between the accelerator pedal and the throttle valve during normal operation.

In order to adjust the throttle valve shaft 22 and consequently the throttle valve 23, therefore, the throttle valve assembly 10 has a drive device 30 which is arranged in the housing 16 of the throttle valve assembly 10. The drive device 30 is shown in section in FIG. 1.

The drive device 30 is arranged in the housing 16 of the throttle valve assembly 10 and comprises an actuator 32 designed as an electric motor. The actuator 32 designed as an electric motor moves the throttle valve shaft 22 via a gear unit 34 designed as a reduction gear unit. The gear unit 34 also belongs to the drive device 30. The actuator 32 is connected, in a way not illustrated in any more detail, to a current source arranged outside the throttle valve assembly 10 and to a control unit. The control unit transmits to the actuator 32 a signal, by means of which the actuator 32 brings about a defined position of the throttle valve shaft 22 via the gear unit 34 designed as a reduction gear unit. The actual position of the throttle valve shaft 22 can be detected via a position detection means 36 which is designed as a potentiometer and in which the slide of the position detection means 36 designed as a potentiometer is connected to the throttle valve shaft 22 in a way not illustrated in any more detail.

To transmit a rotational movement from the actuator 32 designed as an electric motor to the throttle valve shaft 22, the gear unit 34 designed as a reduction gear unit comprises a motor pinion 38 which is connected fixedly in terms of rotation to the drive shaft, not illustrated in any more detail in the drawing, of the actuator 32 designed as an electric motor. The motor pinion 38 meshes with an intermediate wheel 40 which likewise belongs to the gear unit 34 and which is arranged on an axle 42 rotatably in the housing 16 of the throttle valve assembly 10.

The intermediate wheel 40 comprises a pinion 44 and a gearwheel 46. The pinion 44 and the gearwheel 46 are manufactured from plastic 48. The pinion 44 and the gearwheel 46 are connected to one another in the manner of a locking pawl via a ratchet 50. The ratchet 50 is in this case manufactured in a spring-like manner from metal. The ratchet 50 engages, on the one hand, into undercuts 54 of the pinion 44, in such a way that the ratchet 50 and the pinion 44 are connected fixedly in terms of rotation to one another. On the other hand, the ratchet 50 engages into a ratchet arrangement 56 which is arranged on the toothed ring 46. The ratchet arrangement 56 is designed in such a way that, when a defined force threshold is exceeded, the gearwheel 46 rotates in relation to the pinion 44. In this case, the ratchet 50 in the ratchet arrangement 56 moves one or more units along the ratchet arrangement 56 as a function of the force exerted on the gearwheel. Below a defined force threshold, therefore, the gearwheel 46 and the pinion 44 are connected fixedly in terms of rotation to one another, whereas, above a defined force threshold, the gearwheel 46 can be rotated in relation to the pinion 44.

The pinion 44 meshes with a part-toothed ring 58 which is likewise assigned to the gear unit 34. The part-toothed ring 58 is arranged on a lever 60 which is connected fixedly in terms of rotation to the throttle valve shaft 22. The part-toothed ring 58 and the lever 60 are likewise assigned to the gear unit 34. Furthermore, the throttle valve shaft 22 is connected to a first end of a coil spring 62, the second end of which is connected fixedly to the housing 16.

Figure 2:
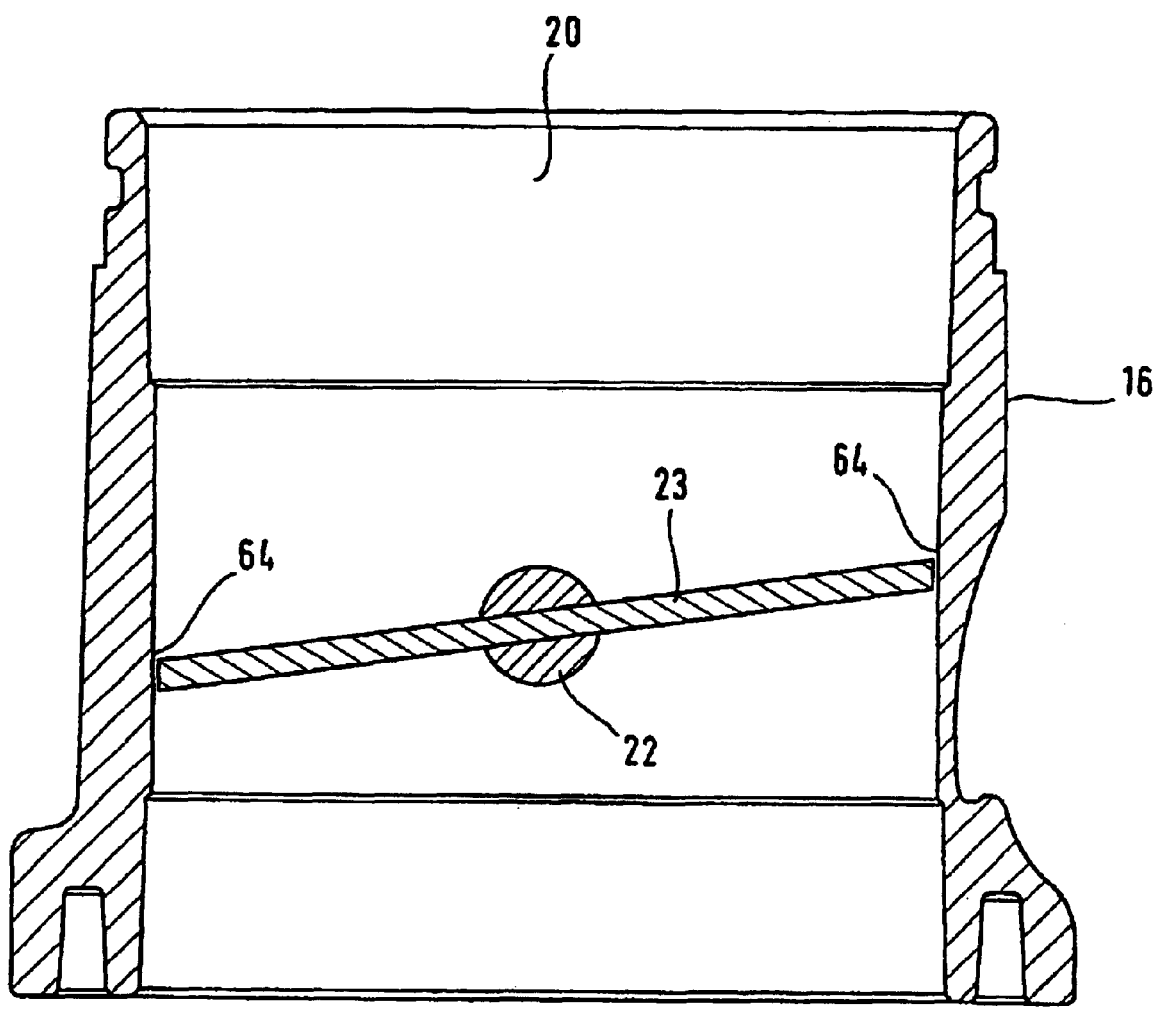
FIG. 2 depicts a longitudinal section through the throttle orifice of the throttle valve assembly according to FIG. 1.

The throttle orifice 20 has a contour 64, as can be seen in detail in FIG. 2. This contour has the effect that, during an adjustment of the throttle valve 23 by means of the drive device 30 in the direction of the closing position, the throttle valve 23 comes to bear against the contour 64 and cannot be moved beyond this abutment position by the actuator 32.

Figure 3:
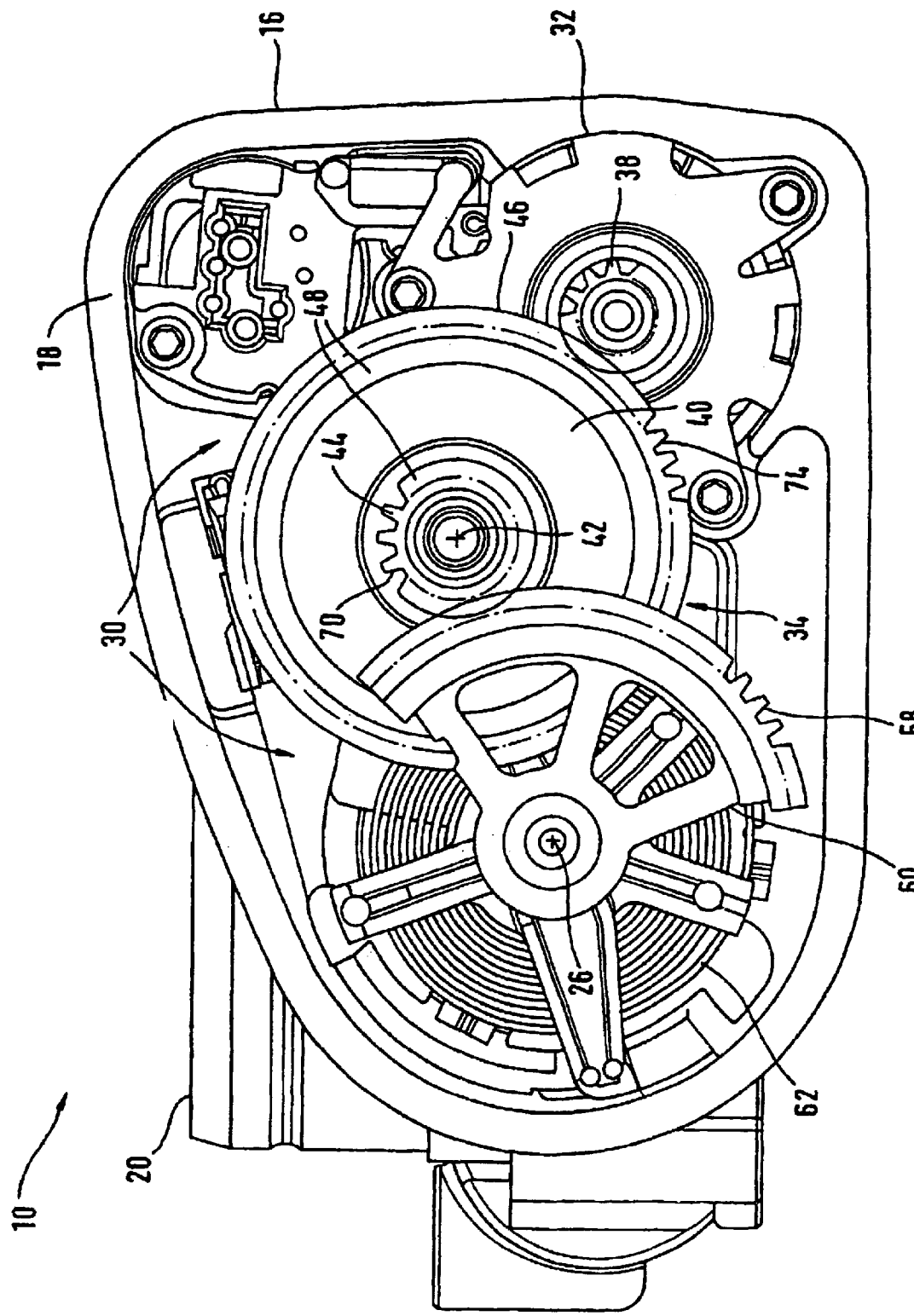
FIG. 3 depicts a top view of the drive device of the throttle valve assembly according to FIG. 1.

FIG. 3 shows the drive device 30 of the throttle valve assembly 10 in a top view. The motor pinion 38 connected fixedly in terms of rotation to the drive shaft of the actuator 32 meshes with the gearwheel 46 of the intermediate wheel 40. The gearwheel 46 is connected to the pinion 44 via the ratchet 50. This connection is arranged on the side facing away from the observer of FIG. 3 and therefore cannot be seen in FIG. 3. What can be seen, however, is the pinion 44 which meshes with the part-toothed ring 58. The part-toothed ring 58 is in this case arranged on the lever 60 connected fixedly to the throttle valve shaft 22.

Figure 4:
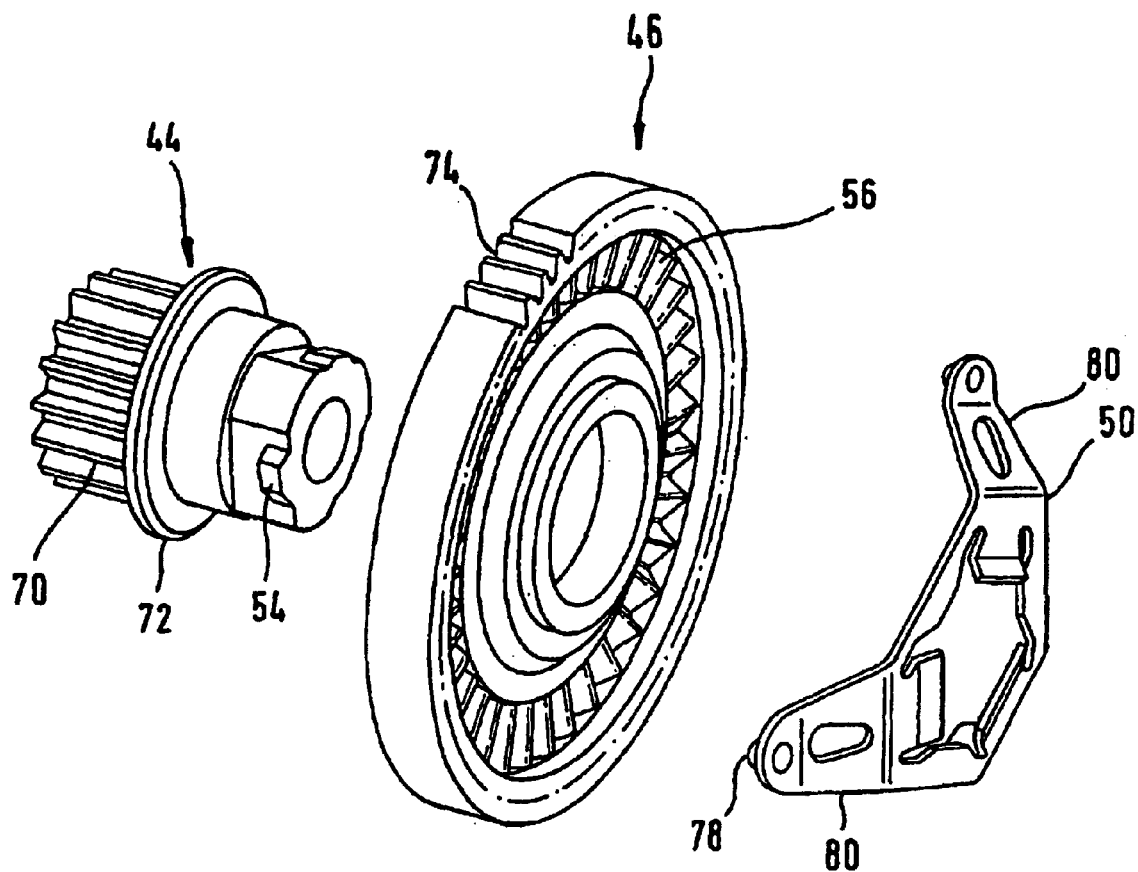
FIG. 4 depicts individual parts of the intermediate wheel of the gear unit.

FIG. 4 shows the individual parts, pinion 44, toothed ring 46 and ratchet 50. The pinion 44 of the intermediate wheel 40 has, on one of its sides, a toothed-ring structure 70 and, on its other side, an undercut 54, into which the ratchet 50 can be locked for a rotationally fixed connection to the pinion 44. In this case, the pinion 44 is to be arranged in the gearwheel 46 of the intermediate wheel 40 by means of a continuous web 72.

The toothed ring 46 has an outer continuous toothedring structure 74 and an inner ratchet arrangement 56. The ratchet arrangement 56 comprises a number of regular inclined planes or ratchet arrangements 76 which are lined up with one another in a circle. In three of these planes or ratchet arrangements 76, the ratchet 50 engages with ratchet geometries 78, preferably spherical, which are arranged at the ends of the three legs 80 of the ratchet 50.

Figure 5A:
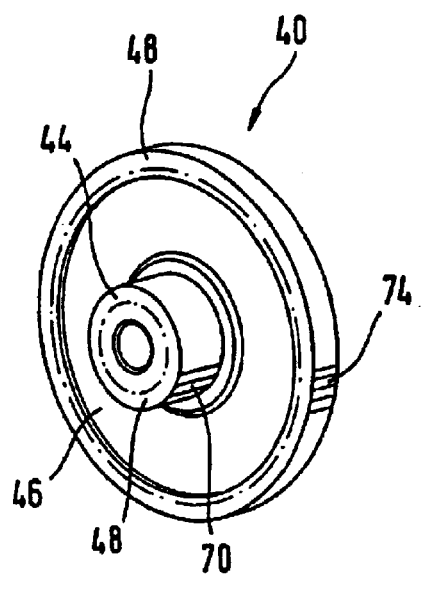
FIG. 5 depicts the intermediate wheel in various views.
Figure 5B:
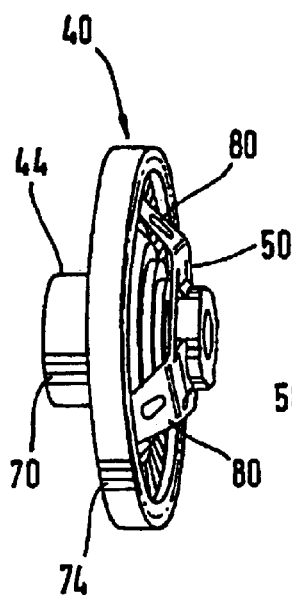
Figure 5C:
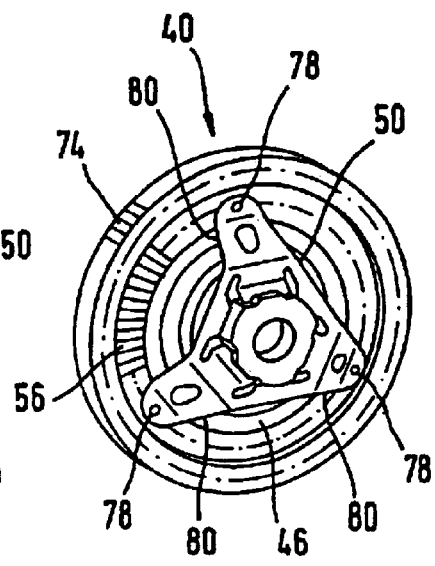

FIG. 5 shows the intermediate wheel from the front in FIG. 5a, from the side in FIG. 5b and from the rear in FIG. 5c.

If, then, a force which exceeds a defined force threshold acts on the gearwheel 46, the spheres or ratchet geometries 78 of the ratchet 50 travel up on the respective inclined planes or ratchet arrangements 76, in order then to lock into the next adjacent inclined plane or ratchet arrangement 78. In this case, as a function of the force acting on the gearwheel, the spheres or ratchet geometries 78 of the ratchet 50 move one or more inclined planes or ratchet arrangements 76 further on.

When the throttle valve assembly 10 is in operation, the throttle valve 23 arranged on the throttle valve shaft 22 is opened and closed via the drive device 30. In this case, the actuator 32 is activated by a control device, not illustrated in any more detail in the drawing. If, then, the actuator 32 or the coil spring 62 moves the throttle valve 23 into the closing position via the gear unit 34, high forces can act on the gear unit 34 in the closing position. The closing position is in this case the position in which the throttle valve 23 substantially closes the throttle orifice 20. After the closing position of the actuator 32 is reached, however, its drive shaft moves further on account of the kinetic energy which is still present in the electric motor. This residue of kinetic energy is transmitted from the drive shaft of the actuator 32 to the gearwheel 46 of the intermediate wheel 40 via the motor pinion 38. However, since the throttle valve 32 now bears against the contour 64, the pinion 44 does not follow the rotational movement of the gearwheel 46. The forces in this case acting on the gearwheel 46 are such that the gearwheel 46 rotates in relation to the pinion 44 by means of the ratchet 50. The ratchet arrangement 56 of the gearwheel 46 is in this case arranged in such a way that the rotational movement of the gearwheel 46 in relation to the pinion 44 corresponds to the preferential direction of rotation of the ratchet engagement between the pinion 44 and the gearwheel 46. Without the ratchet engagement between the pinion 44 and the gearwheel 46, there would be the risk that, when the closing position was reached by the throttle valve 23, individual teeth of the gear unit, in particular of the pinion 44, could fracture, with the result that the throttle valve assembly 10 would, in an extreme situation, become incapable of functioning.

The connection of the pinion 44 to the gearwheel 46 via the ratchet 50 reliably ensures that excess kinetic energy of the actuator 32 can be absorbed even when the throttle valve 23 is secured, for example, in a closing position in the throttle orifice 20 of the throttle valve assembly 10.

We claim:

1. A drive device comprising:

a movable element;

an actuator coupled to said element so as to drive said element; and a gear unit arranged to facilitate coupling between actuator and element, said gear unit comprising a motor pinion, an intermediate wheel and a semi-toothed ring, said intermediate wheel comprising a pinion and a gearwheel connected via a ratchet such that said pinion is fixed with respect to said ratchet and is rotatable with respect to said gearwheel by way of a locking pawl.

2. The drive device according to claim 1, wherein said gearwheel and said pinion comprise plastic, said rachet comprises metal, and said ratchet is snapped onto said pinion.

3. The drive device according to claim 1, wherein said movable element is a throttle valve shaft arranged in a throttle valve assembly and on which a throttle valve is pivotably arranged.

4. A drive device comprising:

a movable element;

an actuator coupled to said element so as to drive said element; and a gear unit arranged to facilitate coupling between actuator and element, said gear unit comprising a motor pinion, an intermediate wheel and a semi-toothed ring, said intermediate wheel comprising a pinion and a gearwheel connected via a ratchet such that said pinion is fixed with respect to said ratchet and is rotatable with respect to said gearwheel by way of a locking pawl, said gearwheel and said pinion comprise plastic, said ratchet comprises metal, and wherein said ratchet is snap fitted to said pinion.

5. The drive device according to claim 4, wherein said movable element is a throttle valve shaft arranged in a throttle valve assembly and on which a throttle valve is pivotably arranged.

* * * * *